United States Patent [19]

Czech et al.

[11] Patent Number: 4,570,892
[45] Date of Patent: Feb. 18, 1986

[54] TILTABLE ROTATING DISPLAY MONITOR MOUNT

[75] Inventors: John F. Czech, Mt. Prospect; Irving M. Drucker, Des Plaines; Akinobu Inaba, Prospect Heights, all of Ill.

[73] Assignee: Zenith Electronics Corporation, Glenview, Ill.

[21] Appl. No.: 680,612

[22] Filed: Dec. 11, 1984

[51] Int. Cl.$^4$ .............................................. A47G 29/00
[52] U.S. Cl. ................... 248/372.1; 248/183; 248/280.1
[58] Field of Search ............... 248/183, 280.1, 278, 248/372.1, 133, 131, 676, 661, 665, 425, 292.1, 178, 186, 349

[56] References Cited

U.S. PATENT DOCUMENTS

| | | | |
|---|---|---|---|
| 3,970,792 | 7/1976 | Benham et al. | 248/183 X |
| 4,068,961 | 1/1978 | Ebner et al. | 248/181 X |
| 4,395,010 | 7/1983 | Hedgeland et al. | 248/371 |
| 4,415,136 | 11/1983 | Knoll | 248/181 |
| 4,453,687 | 6/1984 | Sweere | 248/183 |
| 4,473,206 | 9/1984 | Stillinger | 248/346 X |

OTHER PUBLICATIONS

IBM Technical Disclosure Bulletin, vol. 24, No. 1A (Jun. 1981).

*Primary Examiner*—J. Franklin Foss
*Assistant Examiner*—David L. Talbott
*Attorney, Agent, or Firm*—Cornelius J. O'Connor; Thomas E. Hill

[57] ABSTRACT

A support base for a display monitor provides for the rotation and stable orientation of the monitor over a range of tilt angles. An upper portion of the base is adapted to receive a turntable having an upper concave surface adapted to receive a complementary convex lower portion of the display monitor's cabinet. The concave surface of the turntable includes a first pair of spaced guide rails adapted to receive and engage respective complementary guide rail assemblies positioned on the convex lower portion of the monitor. The convex lower portion of the cabinet is further provided with a pair of spaced projections for insertion within respective elongated apertures in the turntable which are parallel to and in spaced relation with its guide rails. Each of these projection assemblies includes engaging means such as the combination of a spring washer and coiled spring for engaging the turntable adjacent to a respective elongated aperture in maintaining the monitor firmly positioned within the turntable's concave surface. A biasing arrangement urges the monitor in a first direction of rotation within the turntable's concave surface which is opposite to the rotational moment of the monitor due to its center of gravity. The lower surface of the turntable is provided with a pair of spaced bosses which are adapted for insertion within and engagement with a respective arcuate slot in the upper surface of the base to provide secured coupling between the base and the turntable and allow for rotational displacement therebetween.

5 Claims, 12 Drawing Figures

4,570,892

TILTABLE ROTATING DISPLAY MONITOR MOUNT

CROSS-REFERENCE TO RELATED APPLICATION

This application is related to but in no way dependent upon the following application which is assigned to the assignee of the present application and filed in the names of the present inventors: Ser. No. 605,016, filed Apr. 27, 1984, entitled "Tiltable Display Monitor Assembly".

BACKGROUND OF THE INVENTION

This invention relates in general to video display monitor support structures and is particularly directed to an arrangement for stably positioning a display monitor over a wide range of tilt angles and rotational orientations.

Because of the high degree of interaction between a display monitor and its user in such applications as computer terminals, word processors, communications systems, and video monitoring equipment, the human factors considerations engineered into the display monitor are of the utmost importance, particularly to the user. Such parameters as video display sweep rates, background color and contrast, and the general viewability of the information presented on the display monitor, which generally includes a cathode ray tube (CRT), all affect the quality of video information provided to the user and the ability of the user to utilize the thus displayed information.

In the general area of display monitor viewability, human factors engineering has been primarily concerned with improving the presentation of video information with minimum user inconvenience and hardship. A prime consideration has been directed toward the reduction of glare on the faceplate of the display monitor and achieving and maintaining optimum viewing angles relative to the display monitor. Efforts in these areas to improve the presentation of the video information on the display monitor have been primarily directed to the design and use of various display monitor positioning and tilt mechanisms for minimizing glare while optimizing user viewing angle with minimal inconvenience and adjustment of display monitor orientation.

Various approaches have been used in the prior art to selectively adjust the tilt angle of a display monitor. For example, a rotatable friction cam positioned beneath an aft portion of the video display has been used for the selective vertical displacement thereof in providing the desired tilt angle. Another approach makes use of the combination of a convex lower portion of a display platform and a concave portion of a support stand. The convex portion is inserted within the concave portion in a complementary manner and retained therein by means of a spring-loaded wing nut positioned within a longitudinal slot in a friction plate. By displacing the wing nut-spring combination along the longitudinal slot, the convex and concave surfaces are displaced relative to one another and the platform upon which the display monitor is positioned may be tilted as desired. Other approaches involve various complicated arrangements of bellows, flexible members, etc., in combination with various coupled combinations of support links.

One specific prior art approach is disclosed in U.S. Pat. No. 3,789,140 to McQueen et al wherein is described an arrangement for manually tilting the primary image screen of a CRT about a horizontal axis disposed slightly behind the screen by means of a hand wheel exposed through a cabinet enclosing the CRT utilizing a friction pivot on a lateral portion of the CRT. Another approach to a friction pivot-type of CRT tilt arrangement is disclosed in U.S. Pat. No. 4,372,515 to Noonan which provides fore and aft retention by means of a spur gear on an upper support unit and a rack gear on a lower support unit which act to co-locate the origin of the arc of a rocker, the center of gravity, and the origin of the arc of the pitch diameter of the spur gear of the display unit through the tilt range. U.S. Pat. No. 4,410,159 to McVicker et al discloses yet another approach involving a molded base element having a pair of concave tracks in the top and an annular recess in the bottom wherein the concave tracks receive and support a molded cradle element adapted to contain and support a CRT. The annular recess receives an annular support ring adapted to support the base and the cradle with the three assembled CRT support elements maintained in contact with each other by gravity and provided with keepers to maintain assembly of the aforementioned components. The aforementioned cross-referenced patent application provides display monitor tilt control over a wide range of tilt angles, but no rotational displacement of the monitor is afforded.

The present invention represents an improvement over the prior art in that it provides a low cost, reliable, and easily adjusted rotating tilt arrangement for stably positioning a display monitor at a selected tilt angle and in a given viewing direction by directly orienting the display monitor as desired. Once properly positioned, the display monitor remains in that orientation until manually displaced. Counterbalancing moments permit display monitor orientation to be changed with a minimal amount of applied force.

OBJECTS OF THE INVENTION

Accordingly, it is an object of the present invention to provide for improved viewing of a video display monitor.

It is another object of the present invention to provide improved means for adjustably positioning a display monitor for optimum viewing.

Yet another object of the present invention is to provide a low cost, manually adjustable support stand for a display monitor capable of changing the display tilt angle and viewing direction by direct manipulation of the monitor.

A further object of the present invention is to provide for the continuously adjustable positioning of a display monitor over a large tilt angle range, with the display monitor remaining at a fixed viewing angle once positioned as desired.

A still further object of the present invention is to provide a tilt hold mounting arrangement for a display monitor capable of securely maintaining the display monitor at a desired viewing angle once oriented thereat involving direct displacement of the display monitor which eliminates the expense, complexity and imprecise positioning of tilt arrangements having coupling linkage between the tilt control and the display monitor.

Still another object of the present invention is to provide a variable tilt angle and rotatable viewing angle arrangement for a video display monitor which is easily manipulated, offers wide viewing orientation flexibility, involves a minimal number of parts, and is highly reliable.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
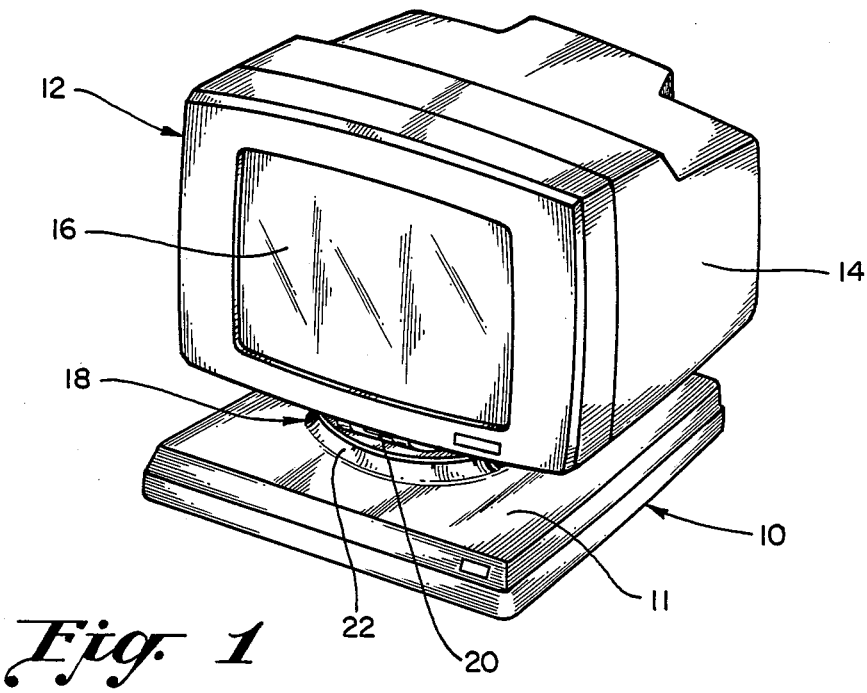
FIG. 1 is an upper perspective view of a video display monitor positioned upon a support base which includes a tiltable rotating display monitor mount in accordance with the present invention.

Referring to FIG. 1, there is shown an upper perspective view of a video display monitor 12 positioned upon a tiltable rotating base 10 in accordance with the present invention. The video display monitor 12 includes an outer cabinet, or housing, 14 within which is located a video display device such as a cathode ray tube (CRT) 16 and associated circuitry (not shown). The tiltable rotating base 10 similarly includes a housing having a generally flat, upper surface 11. There may be positioned within the base 10 additional circuitry (not shown in the figure) for operating the video display monitor 12.

Positioned upon the upper surface 11 of the base 10 is a tilt/swivel assembly 18 which includes a turntable, or swivel, 22 adapted to receive an arcuate convex lower surface 20 of the cabinet 14 for supporting the video display monitor 12. The tilt/swivel assembly 18 permits the video display monitor 12 to be tilted up and down as well as to rotate about an axis generally perpendicular to the plane of the base 11. This permits the viewing angle of the display monitor 12 to be fixed in accordance with the position of the user relative to the video display monitor 12. The viewing angle is changed by directly engaging the video display monitor 12 and orienting it as desired, with the base 10 remaining stationary. Once positioned in the desired orientation, the video display monitor 12 will remain in that position until rotationally displaced when it is desired to change the tilt angle or viewing direction.

Figure 2:
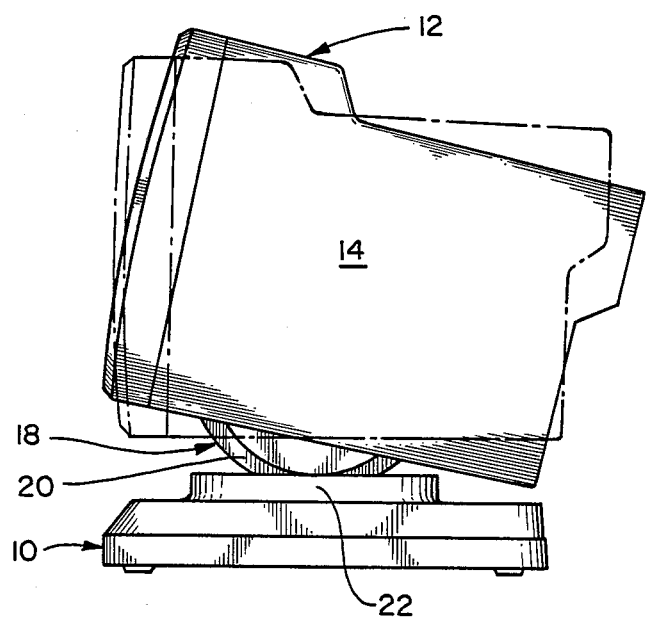
FIG. 2 is a side elevational view of the combination of the video display monitor, tiltable rotating display monitor mount, and base of FIG. 1 illustrating the tilt variation of the display monitor provided by the present invention.

FIG. 2 is a side elevational view showing the video display monitor 12 oriented in two different tilt angles on the tilt/swivel assembly 18 relative to the base 10. The tiltable rotating base 10 of the present invention not only permits the video display monitor's tilt angle to be adjusted as desired, but also permits the viewing direction, or the direction in which the video display monitor's faceplate is pointed, to be varied as desired.

Figure 3:
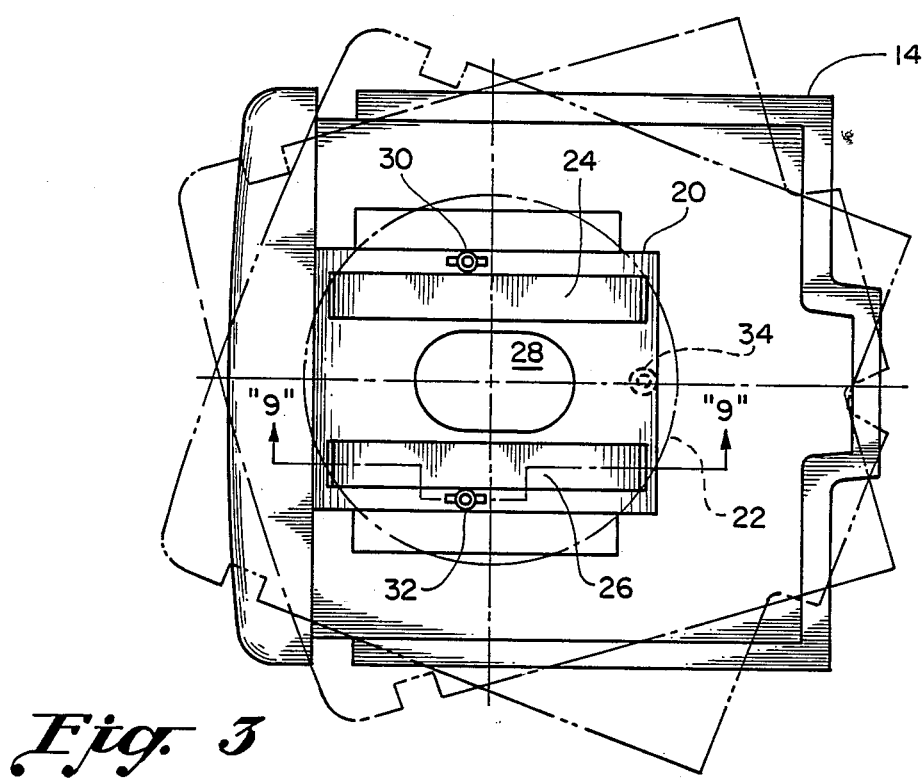
FIG. 3 is a plan view of the bottom of the display monitor's cabinet.

Referring to FIG. 3, there is shown a plan view of the bottom of the cabinet 14 of the video display monitor 12. The lower surface of the cabinet 14 includes an arcuate convex portion 20 extending therefrom. This arcuate convex lower surface 20 includes an aperture 28 in the center thereof as well a pair of spaced, elongated, linear tilt grooves 24 and 26 positioned on opposite sides of the center aperture 28. The first and second tilt grooves 24, 26 are recessed within the convex lower surface 20 of the cabinet 14. Positioned on the inner surface of the lower portion of the cabinet 14 is a mounting post 34 shown in dotted line form in FIG. 3 for coupling a biasing spring to the video display monitor as described in detail below. Postioned immediately adjacent to and outside of the first and second tilt grooves 24, 26 are first and second tilt bosses 30, 32. The first and second tilt bosses 30, 32 extend outward from the convex lower surface 20 of the cabinet 14 and are adapted to receive a coupling pin, such as a screw, in an aperture therein as described below. The arcuate convex lower surface 20 of the cabinet 14 is adapted to be positioned within and supported by a complementary concave upper surface of a turntable, or swivel, portion of the tilt/swivel assembly 18. The position of the turntable is shown in dotted line form in FIG. 3 and is indicated by numeral 22.

Figure 4:
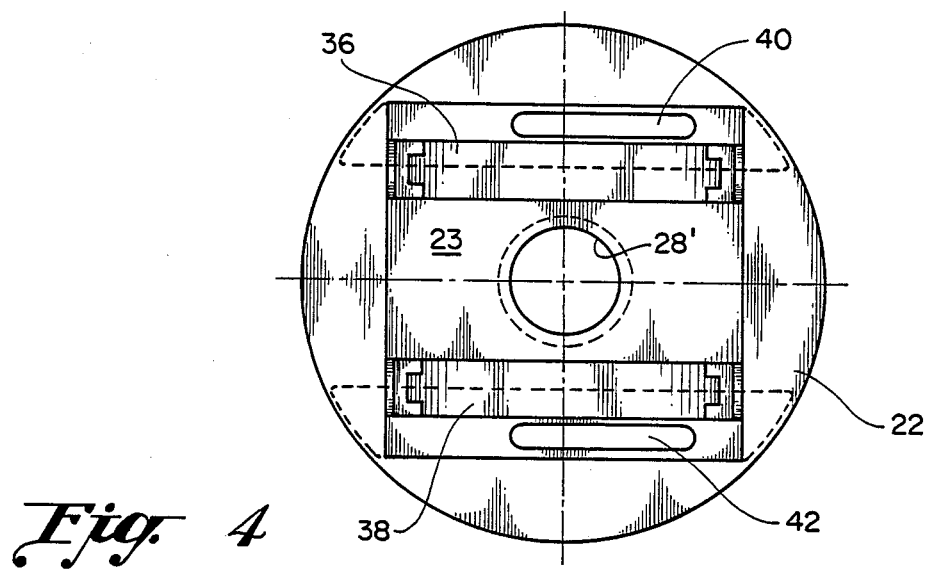
FIG. 4 is a top plan view of a turntable for use in the tiltable rotating display monitor mount of the present invention.
Figure 5:
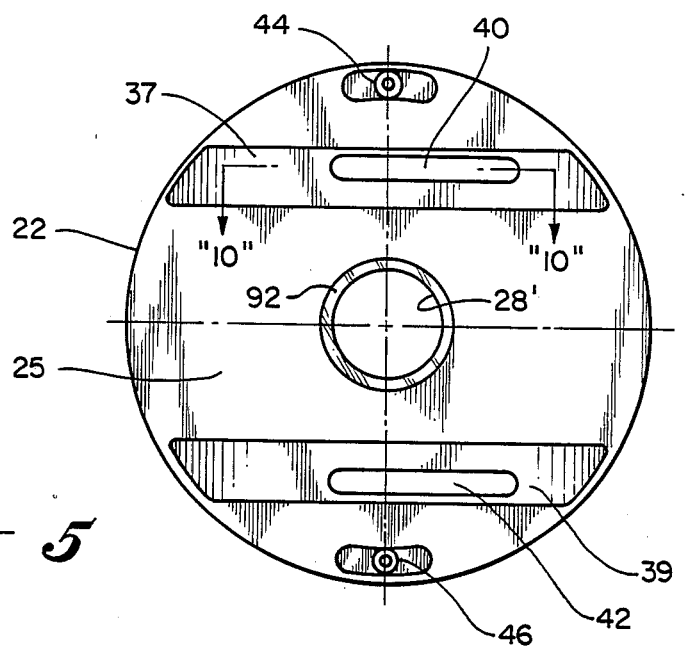
FIG. 5 is a plan view of the bottom of the turntable of FIG. 4.

Referring to FIGS. 4 and 5, there are respectively shown top and bottom plan views of a turntable 22 used in the tilt/swivel assembly 18 for supporting the video display monitor 12. The turntable 22 is generally circular in cross section and includes an upper, concave surface 23 and a lower convex surface 25. The upper concave surface 23 of the turntable 22 is adapted to receive and support the arcuate convex lower surface 20 of the cabinet 14. The turntable 22 includes a center aperture 28' which, with the video display monitor 12 positioned thereon, is in alignment with a corresponding center aperture 28 in the convex lower surface 20 of the cabinet 14. The upper concave surface 23 of the turntable 22 is further provided with a pair of curvilinear, elongated tilt guides 36, 38 which extend from the concave upper surface 23 of the turntable 22. The first and second tilt guides 36, 38 are respectively adapted for insertion in and engagement with corresponding first and second tilt grooves 24, 26 in the convex lower surface 20 of the cabinet 14. Each of the tilt guides is displaceable within a corresponding tilt groove and permits the cabinet 14 to be rotationally displaced about a generally horizontal axis in changing the tilt angle thereof while maintaining alignment between the cabinet 14 and the turntable 22.

A pair of guide slots 40, 42 are also provided in the turntable 22 and are positioned outside of and adjacent to a corresponding tilt guide. Each of the guide slots 40, 42 is adapted to receive a respective tilt boss 30, 32 which provides a secure coupling between the cabinet 14 and the turntable 22 as described below. The forward and aft edges of each of the guide slots 40, 42 form rotation end stops by engaging a respective tilt boss 30, 32 in limiting the rotational displacement, or tilt, of the video display monitor 12 on the turntable 22. The turntable 22 thus provides for changes in the tilt angle of the video display monitor 12 as well as changes in its horizontal viewing angle as described below.

As shown in FIG. 5, the lower convex surface 25 of the turntable 22 is provided with first and second rotation bosses 44, 46 in spaced, facing relation. In addition, first and second tilt guide bottom contours 37, 39 are located on the lower surface of the turntable 22 and respectively include the first and second tilt guide slots 40, 42. Finally, extending from the convex lower surface 25 of the turntable 22 and positioned around the center aperture 28' therein is a cylindrical sleeve 92.

Figure 6:
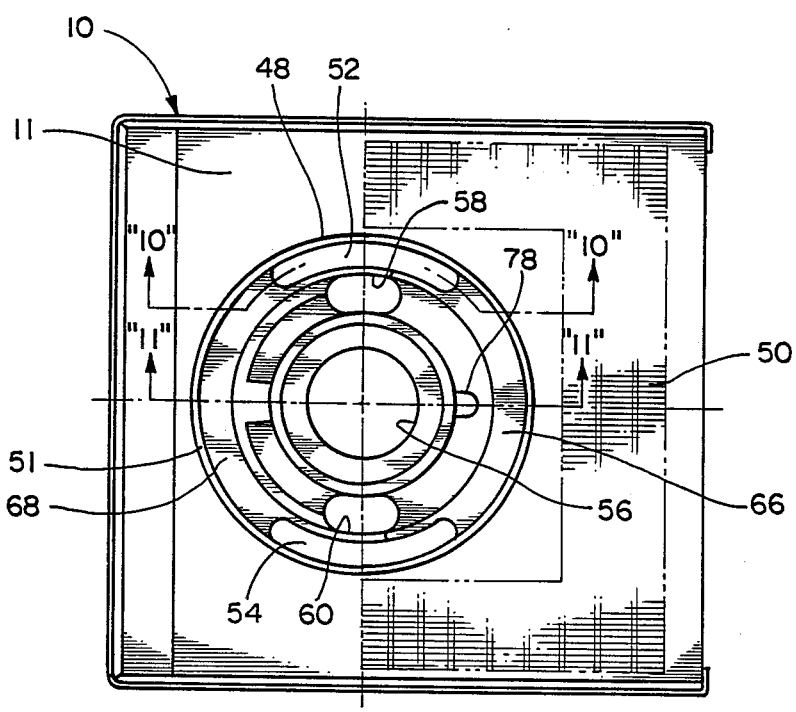
FIG. 6 is a plan view of the upper surface of the base for supporting the turntable and display monitor in accordance with the present invention.
Figure 7:
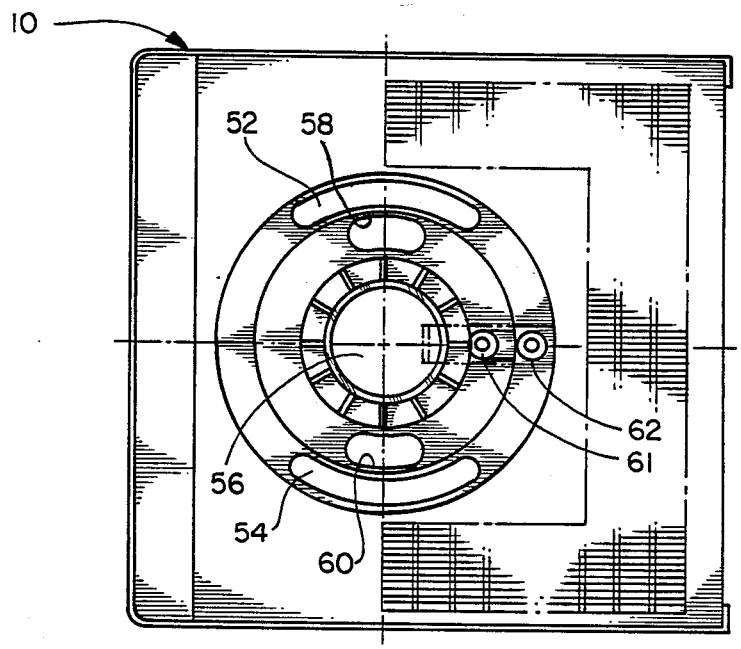
FIG. 7 is a bottom plan view of the display monitor base of FIG. 6.

Referring to FIGS. 6 and 7, there are respectively shown top and bottom plan views of the base 10 upon which the video display monitor 12 is supported. The base 10 is generally rectangular in cross section and includes a plurality of vents or apertures 50 in an upper surface 11 thereof. The vents 50 provide for the escape of heat generated within the base 10 by electronic circuitry (not shown) associated with the operation of the video display monitor 12 and positioned within the base. Also positioned on the upper, flat surface 11 of the base 10 is circular center portion 48 defined by an outer wall 51. The outer wall 51 extends upward from the upper surface 11 of the base 10 and is adapted to receive the aforementioned turntable 22 and to permit the rotation of the turntable within the circular center portion 48 of the base. The circular center portion 48 of the base 10 includes a pair of spaced, arcuate rotation guide slots 52, 54 positioned adjacent the periphery thereof immediately inside the circular outer wall 51. The first and second rotation guide slots 52, 54 are adapted to receive a respective rotation boss 44, 46 positioned on the lower surface 25 of the turntable 22. With a respective rotation boss 44, 46 positioned within each of the rotation guide slots 52, 54, the turntable 22 is maintained within the circular center portion 48 of the base and is free to rotate within the circular outer wall 51. The respective end portions of the first and second rotation guide slots 52, 54 form rotation stops in limiting the rotational displacement of the turntable 22 on the base 10. A circular aperture 56 is located in the center of the circular center portion 48 of the base 10 and is adapted to receive the cylindrical sleeve 92 positioned on the lower convex surface 25 of the turntable 22. Also positioned in the circular center portion 48 of the base are first and second access apertures 58, 60 which are positioned intermediate the center aperture 56 and respective, corresponding rotation guide slots 52, 54. The first and second access apertures 58, 60 provide access to the various components of the tiltable rotating display monitor mount of the present invention during the assembly and disassembly thereof. A forward portion of the circular center portion 48 of the base 10 is provided with a first curvilinear support surface 68, while an aft portion thereof is provided with a second curvilinear support surface 66. The first and second curvilinear surfaces 68, 66 provide support for the turntable 22 when positioned within the outer wall 51 of the circular center portion 48 of the base. Shown in FIG. 7, on the lower surface of the base 10 are forward and aft mounting pin apertures 61, 62 adapted to receive a respective mounting pin (not shown), such as a screw, for securely mounting a bracket to the lower surface of the base 10 as described below. The aft bracket mounting boss 62 appears on the outer upper surface 11 of the base as an upraised portion 78.

Figure 8:
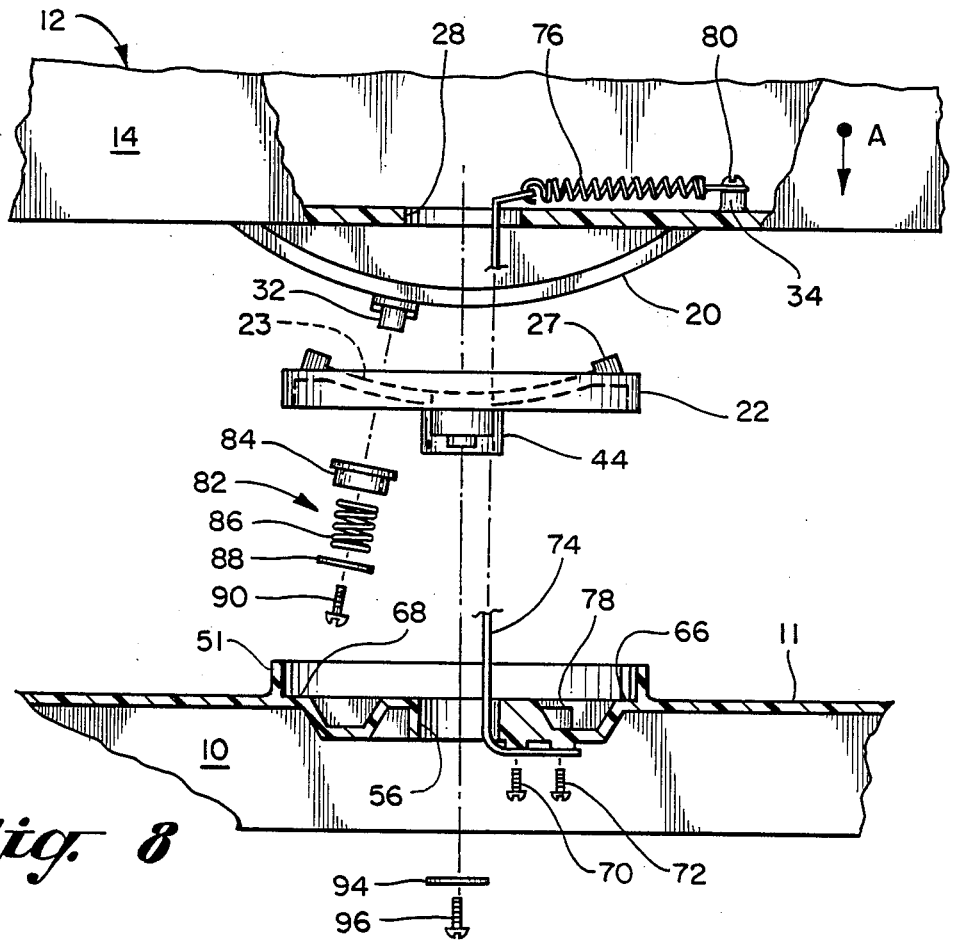
FIG. 8 is an exploded lateral sectional view of an assembled tiltable rotating display monitor mount in accordance with the present invention.
Figure 9:
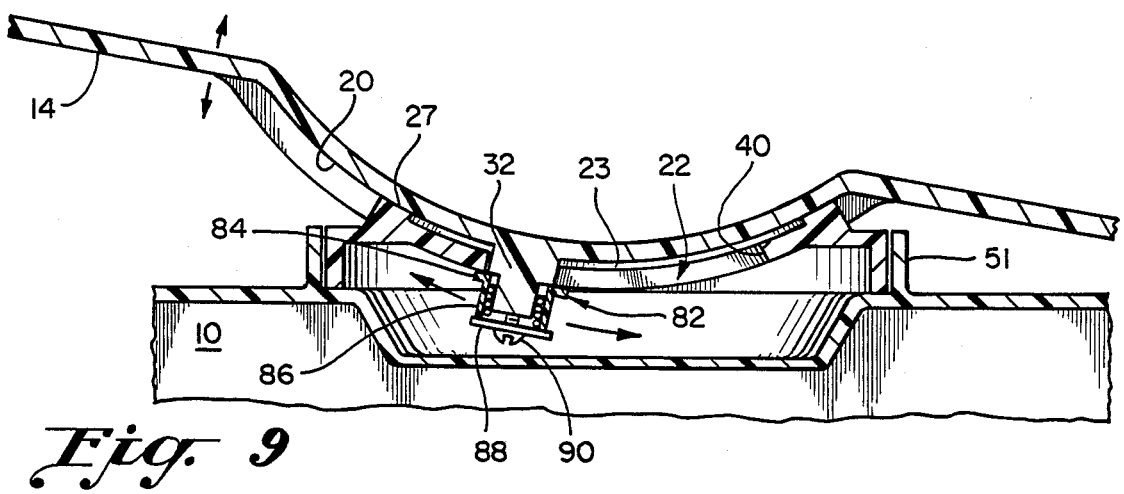
FIG. 9 is a sectional view of an assembled tiltable rotating display monitor mount illustrating the sliding engagement between the display monitor cabinet and the turntable taken along sight line 9—9 in FIG. 3.
Figure 12:
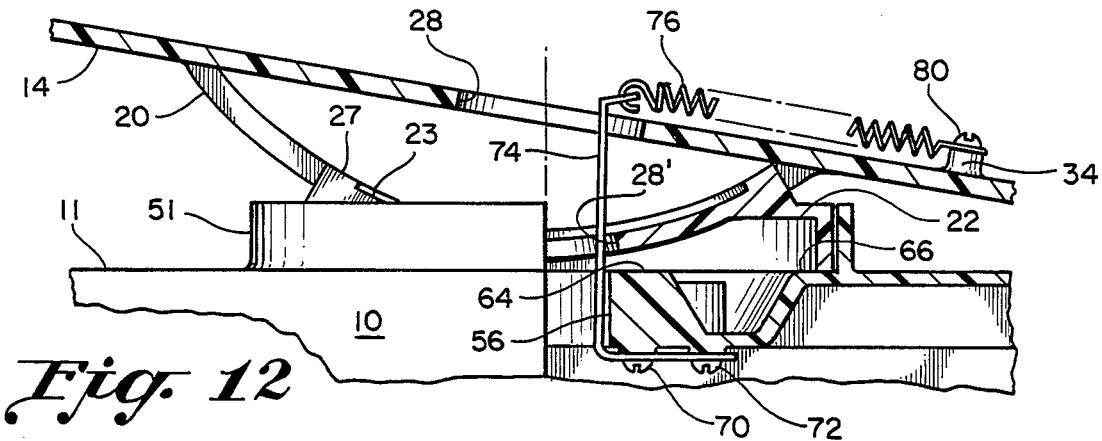
FIG. 12 is a sectional view of the tiltable rotating display monitor mount of the present invention illustrating the tilt biasing arrangement utilized therein.

Referring to FIGS. 8, 9 and 12, there are shown various sectional views of a tiltable rotating display monitor mount in accordance with the present invention. FIGS. 9 and 12 show the convex lower surface 20 of the cabinet 14 positioned within and supported by the turntable 22 which, in turn, is positioned within the circular outer wall 51 defining the circular center portion 48 of the base 10. FIG. 8 is an exploded view of various details of the tiltable rotating display monitor mount. The tilt boss 32 is positioned within the tilt guide slot 40 in the turntable 22 and is maintained therein by means of a tension control mechanism 82 comprised of a bushing 84, a coil spring 86, a washer 88 and a mounting pin, or screw, 90. The bushing 84 is positioned over the tilt boss 32 and is maintained thereon by the combination of coil spring 86, washer 88 and threaded mounting pin 90. By adjusting the position of the mounting pin 90 within the tilt boss 32, the position of the washer 88 relative to the coil spring 86 may be set as desired. By displacing the washer 88 toward the tilt boss 32, increasing compressive force may be applied to the coil spring 86 which, in turn, exerts an increasing force upon the bushing 84 which is in abutting contact with the convex lower surface 25 of the turntable 22. Thus, by tightening mounting pin 90, the engagement between the cabinet 14 of the video display monitor 12 and the turntable 22 may be increased resulting in the necessity to apply increased force to the video display monitor for changing its tilt angle. Conversely, by loosening the mounting pin 90, the force required to change the video display monitor's tilt angle may be correspondingly reduced. As shown in these various sectional views, the lower convex surface 20 of the cabinet 14 is positioned in contact with and supported by a circular, outer peripheral support rim 27 on the turntable 22.

Figure 10:
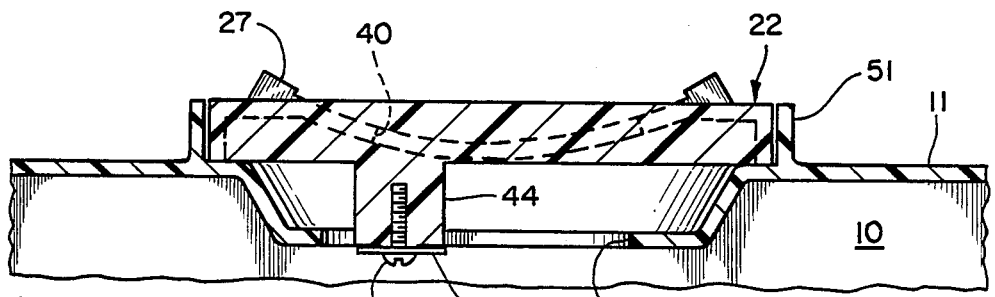
FIG. 10 is a sectional view illustrating the coupling between the turntable and the display monitor base taken along sight line 10—10 in FIG. 6.

As previously described, the first and second rotation bosses 44, 46 are positioned on the lower surface of the turntable 22 and extend downward therefrom. As shown in FIG. 10, the rotation boss 44 is positioned within the rotation guide slot 52 in the upper surface 11 of the base 10. Each of the rotation bosses 44, 46 is maintained in position by means of a respective combination of a washer 98 and a threaded mounting pin 100. The washer 98 engages a lower surface of the upper portion of the base 10 and ensures that the rotation boss 44 is maintained within the rotation guide slot 52.

Mounted to a lower portion of the upper surface 11 of the base 10 by means of forward and aft mounting pins 70, 72 is a generally L-shaped bracket 74. The L-shaped bracket extends upward through the center aperture 56 in the base, the center aperture 28' in the turntable, and the center aperture 28 in the lower surface of the cabinet 14. The upper end of the bracket 74 is coupled to the combination of a mounting boss 34 in the lower surface of the cabinet 14 and a coupling pin 80 by means of an extension spring 76. With the center of gravity of the video display monitor 12 generally positioned aft of the lowest point in the convex lower surface 20 of the cabinet 14 as generally shown by the point "A" in FIG. 8, the combination of bracket 74 and extension spring 76 exerts a moment counter to that exerted by the center of gravity of the video display monitor 12. The combination of these counteracting moments ensures that the video display monitor 12 is in rotational equilibrium about a generally horizontal tilt axis. This arrangement minimizes the displacement force required to be exerted upon the video display monitor in changing its tilt angle. The present invention is not limited to an arrangement where the center of gravity of the video display monitor 12 is positioned aft of its lowest point, but will work equally as well if the video display monitor's center of gravity is positioned forward of this point by merely changing the position at which the extension spring 76 is securely coupled to the cabinet 14 of the video display monitor 12.

Figure 11:
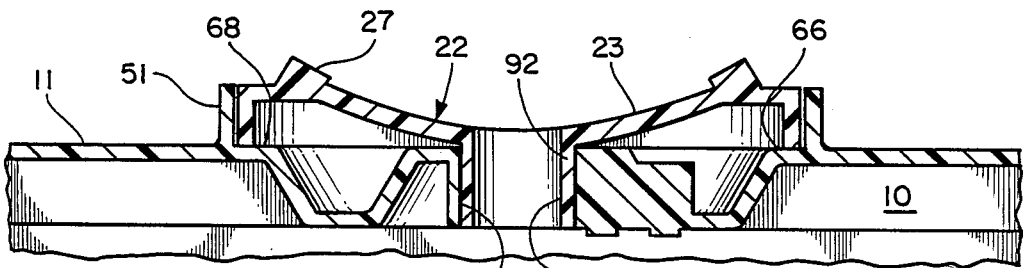
FIG. 11 is a sectional view taken along sight line 11—11 in FIG. 6 showing the turntable positioned upon the base.

Referring to FIGS. 10 and 11, there are shown various details of the positioning of the turntable 22 upon the upper surface 11 of the base 10. As previously described, the cylindrical sleeve 92 about the turntable's center aperture 28' is positioned with an extends through the corresponding center aperture 56 in the base 10. The turntable 22 is supported by the forward and aft curvilinear support surfaces 68, 66 in the base. Finally, as previously mentioned, a circular support rim 27 extends upward from the periphery of the concave upper surface 23 of the turntable 22 for engaging and supporting the convex lower surface of the cabinet 14.

There has thus been shown a tiltable rotating display monitor mount which provides for the rotation and stable positioning of the monitor over a continuous range of tilt angles. Means are provided for counterbalancing the rotational tilt moment of the display monitor's center of gravity in providing for the rotational equilibrium of the display monitor, the tilt angle of which may be adjusted as desired by merely grasping and rotating the display monitor itself. The display monitor is freely rotatable upon the base and is securely coupled thereto.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A tiltable rotating assembly for a display monitor having a convex lower portion with a first aperture therein for stably positioning said display monitor over a continuum of tilt and rotational orientation angles, said assembly comprising:
   - a base having a generally flat, circular upper recessed portion including a pair of facing arcuate slots therein and a second aperture positioned therebetween and generally in the center of said upper recessed portion;
   - a generally circular housing adapted for insertion within the upper recessed portion of said base and including first coupling means positioned within said arcuate slots for coupling said housing to said base and for permitting rotational displacement therebetween, said housing further including an upper concave portion adapted to receive the convex lower portion of the display monitor and having a pair of elongated, spaced slots and a third aperture positioned therebetween and generally in the center of the upper concave portion of said circular housing, wherein said first, second and third apertures are aligned with one another;
   - second coupling means including first and second connecting members mounted in spaced relation to the convex lower portion of the display monitor and inserted through a respective elongated slot in the upper concave portion of said housing in combination with a respective combination of a coil spring and a bushing positioned in contact with said housing for coupling said display monitor to said housing and for permitting the displacement of the display monitor over a continuum of tilt angles, wherein the engagement between said display monitor and said housing may be varied by adjusting the force exerted upon said bushing by said coil spring and wherein the center of gravity of said display monitor exerts a rotational moment urging said display monitor in a first direction of rotation within said housing;
   - first and second pairs of complementary, mutually engaging guide rails respectively positioned on the convex lower portion of the display monitor and on the upper concave portion of said housing, wherein each of said second pair of guide rails is parallel to and closely spaced from a respective elongated slot in the upper concave portion of said housing; and
   - biasing means positioned within said aligned first, second and third apertures and coupling said display monitor and said base for urging said display monitor in a second, opposite direction of rotation within said housing in counterbalancing the rotational moment of said display monitor's center of gravity in providing for the stable positioning of said display monitor over a continuum of tilt angles.

2. A tiltable assembly in accordance with claim 1 wherein said second coupling means are adjustable for controlling the engagement between said display monitor and said housing.

3. A tiltable assembly in accordance with claim 1 wherein said biasing means includes a bracket coupled to said base and an elongated resilient member coupled to the display monitor.

4. A tiltable assembly in accordance with claim 3 wherein said elongated resilient member comprises an extension spring.

5. A tiltable assembly in accordance with claim 1 wherein the elongated slots in the concave portion of said housing each include forward and aft end portions for engaging said second coupling means in forming upper and lower tilt angle rotation stops.

* * * * *